United States Patent Office 3,649,610
Patented Mar. 14, 1972

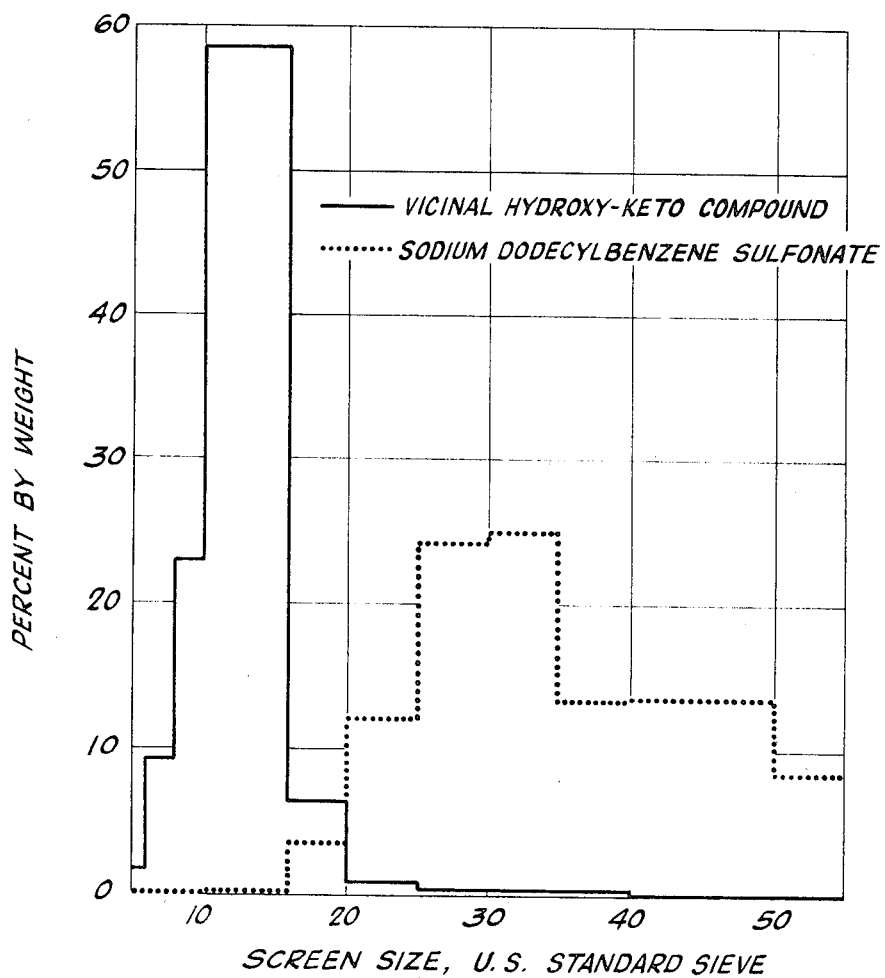

3,649,610
PROCESS FOR THE POLYMERIZATION OF VINYL AROMATIC MONOMERS IN AQUEOUS SUSPENSION
Harold A. Wright, Murrysville, Pa., assignor to Sinclair-Koppers Company
Continuation-in-part of application Ser. No. 689,969, Dec. 12, 1967. This application June 22, 1970, Ser. No. 48,418
Int. Cl. C08f 1/11, 7/04, 7/06
U.S. Cl. 260—93.5 W    4 Claims

ABSTRACT OF THE DISCLOSURE

The production of polymer beads by a suspension polymerization process in which a vinyl aromatic monomer having a free-radical generating catalyst dissolved therein is suspended in an aqueous medium with the aid of a finely divided phosphate suspending agent and heated to cause the monomer to polymerize into polymer beads is improved by the addition to the suspension of at least about 0.01% by weight based on monomer of a terminal vicinal hydroxy-keto compound as sole extender. The process of the invention is especially applicable in the preparation of large spherical polymer beads.

CROSS-REFERENCE TO RELATED APPLICATION

This application is a continuation-in-part of my co-pending application Ser. No. 689,969, filed Dec. 12, 1967 and now abandoned.

BACKGROUND OF THE INVENTION

Free-radical initiators, particularly peroxidic initiators such as benzoyl peroxide, are commonly used as the primary initiator, or catalyst, in the suspension polymerization of vinyl aromatic monomers such as styrene. These initiators, being predominantly oil soluble and water insoluble, are believed to react within the monomer droplets in suspension to cause the polymerization in the following manner:

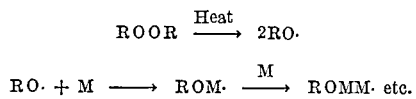

Grim Pat. 2,673,194, describes the suspension polymerization of vinyl aromatic monomers, whereby an oily monomer is suspended as droplets in an aqueous medium and polymer beads or particles are produced by the use of an oil-soluble polymerization catalyst, such as benzoyl peroxide. The suspending system of the Grim patent is comprised of finely divided, difficult water-soluble phosphates, and an anionic surface-active agent which serves as an extender. As used in this art, compounds which act to increase the ability of the finely divided phosphate dispersant and to stabilize suspensions are termed extenders. The extenders increase the ability of the phosphate dispersant to maintain stable suspensions with a greater proportion of monomer and/or polymer in the suspension polymerization medium. Among the extenders listed by Grim are: dodecylbenzene sodium sulfonate, sodium tetradecyl sulfate, potassium stearate, and long chain alkyl sulfonates.

The suspension systems such as that of Grim produce polymer beads having a broad particle size distribution. The individual beads produced in suspension may range in diameter from less than 300 microns to above 2,000 microns with the average bead diameter being dependent upon the amount of suspending agent and extender present in the system. The average bead diameter can be controlled to some extent by varying the parameters of the system such as the ratio of suspending agent to extender or the ratio of suspending agent and extender to monomer. Although the average diameter size is changed through such variations, nevertheless, beads will be produced whose particle size range is broad.

For commercial reasons, it is highly desirable in this art to control the average particle size range within relatively narrow limits. This is especially true where the polymer beads are to be impregnated with a volatile expanding agent to produce polymer beads which will, upon heating, expand, e.g. in a mold, to fill the mold cavity and produce fused, expanded polymer articles.

One of the largest uses of the expandable polymer, polystyrene, which is produced commercially by suspension polymerization is in insulation applications such as insulation board. In manufacturing insulation board, it is common to mold a large (e.g. 4' x 8' x 20') billet of expanded polystyrene and subsequently cut the billet into slabs one or two inches thick for ultimate use as an insulation board. In preparing the large billets from expandable polymer beads, the beads are first pre-expanded to form non-fused, partially expanded beads having a bulk density of from 0.8–1.2 pounds per cubic foot. The partially expanded beads are then charged to the billet mold, and heat, usually in the form of steam, is applied to fully expand the beads whereby they fill the mold, fuse, and form the billet.

In the billet-molding application, it is especially critical that the expandable polymer beads be relatively large and substantially spherical.

If the beads are too small, then the expandable beads at the outer surface of the billet mold will fuse too soon, thereby excluding steam from the center of the mold. The resulting billet, therefore, has a center of unfused, expandable beads which is, of course, highly undesirable since any unfused portion of the billet is useless.

SUMMARY OF THE INVENTION

It has been found that polymer beads, having a narrow particle size distribution can be obtained by the suspension polymerization of a vinyl aromatic monomer in an aqueous system containing a difficulty water-soluble phosphate and a novel extender for that phosphate comprising a compound having a terminal vicinal hydroxy-keto structure. By terminal vicinal hydroxy-keto structure is meant a primary hydroxyl carbon having in the adjacent position thereto a keto group; fructose, for example, has such a structure. The process of this invention is especially well suited for the preparation, by suspension polymerization, of spherical polymer beads having a particle size which for the most part is greater than about 750 microns, e.g. 1200–2400 microns.

DESCRIPTION OF THE DRAWING

The drawing is a bar graph comparing the bead size distribution obtained in accordance with the process of the invention and distribution obtained using a conventional polymerization system of tricalcium phosphate and sodium dodecylbenzene sulfonate.

DETAILED DESCRIPTION

This invention is applicable in the suspension polymerization of vinyl aromatic monomers such as styrene, alpha-methyl styrene, mono- and dichloro styrene, as well as the copolymerization of vinyl aromatic monomers with such monomers as divinylbenzene, alkyl acrylates, diaryl esters of dibasic, aliphatic or aromatic acids, butadiene, and other polymers capable of further polymerization such as styrene-butadiene, styrene-isoprene, and polybutadiene rubbers.

The finely divided, difficultly water-soluble phosphates useful as dispersing agents in the practice of this invention are conventional and are those described, for example, in Grim Pat. 2,673,194. They include those finely divided phosphates difficultly soluble in water containing for each phosphate group at least three equivalents of a metal, the carbonate of which is only slightly soluble in water, e.g. tricalcium phosphate, hydroxy-apatite, magnesium phosphate, etc. Advantageously, the amount of phosphate to be employed in this invention ranges from about 0.20 to 2.0% by weight based on monomer. The average particle size of polymer beads produced in the suspension polymerization depends primarily upon the total amount of phosphate suspending agent; for example, suspension with larger amounts of phosphate suspending agents yield beads of a smaller average particle size.

The use of the novel extenders, i.e. terminal vicinal hydroxy-keto compounds of this invention as sole extender reduces the proportion of polymer particles produced that have sizes that deviate substantially from the mean particle size of the polymer beads produced. Surprisingly, the extenders of this invention allow the production of large, yet spherical beads having few or no out-of-round beads. It had been the experience heretofore that when large bead sizes were obtained, the beads produced were not spherical. Surprisingly also, the bead size distribution of the beads is confined within selected narrow limits by providing an extender in accordance with this invention for the difficultly water-soluble phosphate comprising a compound having a terminal vicinal hydroxy-keto structure. The hydroxy-keto compound is added as the sole extender in the system. When used in combination with other materials such as diphenylethane and a carboxylic acid, as for example in Harris, U.S. Pat. 3,214,497, the combination of extenders have been shown to cause failure of suspension, rather than bead-size regulation.

Suitable extenders found to be effective in accordance with the invention are, e.g. fructose, sorbose, 1,3-dihydroxy-acetone, monohydroxy acetone, invert sugar, and mixtures thereof. All these extenders are characterized by the fact that each contains a terminal vicinal hydroxy-keto structure of the formula:

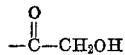

The amount of extender to be used varies from a threshold amount of at least about 0.01 to about 5% by weight based on monomer charged. Amounts less than 0.01% do not function as extenders so that the suspension fails at higher monomer/water ratios. Amounts greater than about 5% do not show any increase in effectiveness over a lesser amount. The preferred amounts range from about 0.1–3%.

The process of the invention may be used with monomer to water ratios which vary from about 0.3 to 1.5 parts by weight monomer per 1.0 part by weight water. The invention is especially valuable in that generally high monomer to water ratios are used, and a higher proportion of monomer in the suspension system is, of course, preferred from an economic standpoint.

The time and temperature cycles for the polymerization may be those conventionally employed. Conveniently, the cycle described in the Grim patent above, or the two-stage temperature cycle described in D'Alelio Pat. 2,692,260 is employed.

The free-radical initiating catalysts which are added to the suspension system are the conventional oil-soluble (monomer-soluble) oxidation catalysts such as organic peroxides, e.g. benzoyl peroxide and t-butylperbenzoate. Other free-radical producing catalysts that may be used in the invention include azobisisobutyronitrile. Conveniently, conventional amounts of such catalysts are used in the invention.

This invention is further illustrated by, but is not intended to be limited to, the following examples wherein parts are parts by weight unless otherwise indicated.

EXAMPLE I

To a reactor equipped with a three-bladed impeller there was added 73 parts of water, 0.50 part of the dispersing agent, tricalcium phosphate, 0.25 part of invert sugar (a sugar mixture containing 50% by weight of the vicinal hydroxy-keto compound, fructose), 0.30 part of the catalyst comprising 0.25 part of benzoyl peroxide and 0.05 part of t-butyl perbenzoate, and 100 parts of styrene monomer. The suspension was agitated at 110 r.p.m. and heated to 90° C. within a period of 85 minutes. The suspension was maintained with stirring at 90° C. for an additional 6 hours after which it was cooled and acidified with HCl to a pH of about 1.0 to dissolve the phosphate. The beads were separated by centrifuge, washed with water, and air dried. The beads were screened into portions. The screen analysis, U.S. Standard Sieve, in percent by weight of polymer beads retained on each size screen, is shown in Table I below.

TABLE I.—SCREEN SIZE DISTRIBUTION

[Weight percent polymer retained on screen number (U.S. Standard Sieve Series)]

| Terminal vicinal hydroxy-keto extender | Screen Number | | | | | | | | |
|---|---|---|---|---|---|---|---|---|---|
|  | 6 | 8 | 10 | 16 | 20 | 25 | 40 | 50 | Pan |
| Invert sugar | 1.7 | 9.2 | 23.0 | 58.5 | 6.2 | 0.8 | 0.4 | | |

EXAMPLE II

So that a comparison could be made of the product of the invention with the product made by the use of an extender such as described in Grim Pat. No. 2,673,194, there were added to a reactor equipped with a three-bladed impeller, 42 parts of water containing 0.1316 part of the suspending system consisting of 0.131 part of tricalcium phosphate and 0.0006 part of sodium dodecylbenzene sulfonate (Nacconol NRSF), and 58 parts of styrene monomer having dissolved therein 0.171 part of the catalyst comprising 0.145 part benzoyl peroxide and 0.026 part t-butyl perbenzoate. The suspension was agitated at 68 r.p.m. and heated to 90° C. which took 60 minutes. The suspension was maintained at 90° C. for 365 minutes after which it was cooled and acidified with HCl to a pH of about 1.0 to dissolve the phosphate. The beads were separated by centrifuge, washed with water, and air dried. The beads were screened. The screen analysis, U.S. Standard Sieve, is shown in Table II below.

TABLE II.—SCREEN SIZE DISTRIBUTION

[Weight percent polymer retained on screen number (U.S. Standard Sieve series)]

| Anionic surfactant extender | Screen Number | | | | | | | | |
|---|---|---|---|---|---|---|---|---|---|
|  | 10 | 16 | 20 | 25 | 30 | 35 | 40 | 50 | Pan |
| Sodium dodecylbenzene sulfonate | 0.1 | 0.2 | 3.4 | 12.1 | 24.1 | 24.9 | 13.2 | 13.3 | 8.4 |

The screen analysis obtained in Examples I and II as shown in Tables I and II are graphically illustrated in the drawing. The polymerization by the method of the invention in the presence of the terminal vicinal hydroxy-keto sugar produces a bead diameter size range which is extremely narrow, and of relatively large average particle size. The useful yield of product obtained by the method of the invention was almost 100 percent of monomer charged. The yield of product obtained by the prior art method using a dodecylbenzene sodium sulfonate extender with the tricalcium phosphate suspension system was, in a desirable particle size, only about 75 percent weight of monomer charged with the remaining 25 percent by weight being too fine.

EXAMPLE III

In order to illustrate the critical nature of the terminal vicinal hydroxy-keto structure of the extenders in this invention, the following series of polymerizations was carried out using a standard procedure and receipe except that the extender was varied as is shown in Table III.

To each of a series of 12-ounce Crown cap bottles, was added 100 parts of water containing 0.25 part of the dispersing agent, tricalcium phosphate, 0.30 part of catalyst consisting of 0.25 part of benzoyl peroxide and 0.05 part of t-butyl perbenzoate, 100 parts of styrene monomer and the weight percent of extender based on styrene monomer shown in Table III below. The bottles were placed in an oil bath at 90° C. and heated for 7 hours at 90° C. with end-over-end agitation, after which the suspensions were cooled and acidified with HCl to a pH of about 1.0. The beads were separated from the aqueous phase and washed with water by means of a centrifuge, and were then air dried on trays and screened into portions. The weight percent retained on each screen number is reported in Table III below.

cle size) control. On the other hand, acetone (III–8) did not function as an extender and caused the suspension to fail. Likewise, glucose (III–10) caused suspension failure, but fructose, a terminal vicinal hydroxy-keto compound (III–1) functioned excellently.

EXAMPLE IV

In order to illustrate the effect of concentration of suspending agent-extender on the particle size distribution, the following series of polymerizations were carried out in the manner of Example III with the concentrations of the tricalcium phosphate suspending agent and extender being as noted in Table IV. All parts are based on one-hundred parts of monomer (styrene) charged.

TABLE IV

| Polymerization | Tricalcium phosphate, parts | Extender | Parts extender | Screen analysis (weight percent) Screen Number | | | | | |
|---|---|---|---|---|---|---|---|---|---|
| | | | | 10 | 16 | 20 | 25 | 40 | Pan |
| IV-1 | 0.2 | α,ω-Dihydroxyacetone | 0.2 | 4.7 | 50.7 | 13.0 | 29.0 | 2.7 | 0. |
| IV-2 | 0.3 | do | 0.3 | 0.9 | 13.8 | 31.8 | 38.2 | 10.7 | 3.0 |
| IV-3 | 0.4 | do | 0.4 | 5.8 | 3.2 | 15.2 | 37.5 | 32.7 | 5.5 |
| IV-4 | 0.25 | do | 0.25 | 0.9 | 22.3 | 38.8 | 12.4 | 20.2 | 4.4 |
| IV-5 | 0.25 | do | 0.05 | 2.3 | 32.4 | 38.2 | 9.1 | 12.7 | 4.1 |
| IV-6 | 0.25 | do | 0.01 | Suspension failed | | | | | |
| IV-7 | 0.5 | Fructose | 0.5 | 0.5 | 29.8 | 37.2 | 15.0 | 14.3 | 1.2 |
| IV-8 | 0.4 | do | 0.4 | 0.7 | 44.4 | 31.3 | 10.6 | 10.0 | 0.5 |
| IV-9 | 0.3 | do | 0.3 | 34.2 | 42.4 | 13.5 | 4.9 | .6 | 0.3 |
| IV-10 | 0.6 | do | 4.0 | 2.1 | 12.7 | 12.9 | 14.1 | 35.6 | 19.7 |
| IV-11 | 0.5 | do | 0.33 | 2.0 | 20.0 | 30.6 | 13.5 | 24.5 | 6.9 |
| IV-12 | 0.4 | do | 0.27 | 6.5 | 49.2 | 26.9 | 7.6 | 7.1 | 0.5 |
| IV-13 | 0.4 | 1/1 fructose/glucose | 0.4 | 10.2 | 51.5 | 23.0 | 6.6 | 6.5 | 1.1 |
| IV-14 | 0.4 | do | 0.6 | 2.7 | 36.2 | 34.9 | 12.1 | 12.0 | 2.2 |
| IV-15 | 0.4 | do | 0.8 | 5.0 | 25.2 | 36.1 | 18.3 | 11.7 | 2.1 |
| IV-16 | 0.5 | do | 0.6 | 2.9 | 23.2 | 25.7 | 19.2 | 22.4 | 4.0 |
| IV-17 | 0.5 | do | 0.8 | 3.1 | 20.4 | 27.1 | 14.3 | 23.9 | 8.8 |
| IV-18 | 1.0 | Invert sugar (72%) [1] | 1.0 | | 3.0 | 11.9 | 12.8 | 60.2 | 10.5 |
| IV-19 | 1.0 | do | 0.5 | 0.2 | 6.4 | 23.4 | 32.0 | 34.7 | 2.2 |
| IV-20 | 0.3 | do | 5.0 | 2.1 | 66.7 | 22.3 | 4.1 | 2.2 | Nil |
| IV-21 | 0.3 | do | 3.0 | 33.5 | 53.4 | 7.3 | 1.5 | 1.6 | Nil |

[1] A commercially available sugar mixture containing 72% by weight of a 1/1 glucose/fructose fraction.

The above Table IV illustrates that the terminal vicinal hydroxy-keto extenders of this invention may be employed to produce particles from a suspension polymerization system having a narrow range of particle sizes, which may be either large or fine depending on the size desired. The optimum concentration and proportion of phosphate suspending agent to extender varies to yield a particular range of bead sizes with the extender employed and may

TABLE III

| Polymerization | Extender, parts | Terminal vicinal hydroxy-keto structure | Comments | Screen Analysis (Number) —weight percent | | | | |
|---|---|---|---|---|---|---|---|---|
| | | | | 10 | 16 | 25 | 40 | Pan |
| III-1 | Fructose, 0.3 | Yes | | 28.3 | 49.2 | 16.5 | 4.3 | 0.9 |
| III-2 | Sucrose, 0.3 | No | Suspension failed | | | | | |
| III-3 | Maltose, 0.3 | No | do | | | | | |
| III-4 | Sorbose, 0.3 | Yes | | 35.2 | 47.2 | 22.8 | 4.8 | Nil |
| III-5 | α,ω-Dihydroxyacetone, 0.3 | Yes | | 2.3 | 32.4 | 47.3 | 12.7 | 4.1 |
| III-6 | 3-hydroxy-2-butanone, 0.3 | No | Suspension failed | | | | | |
| III-7 | Monohydroxyacetone, 0.3 | Yes | Visual condition of recovered beads predominately 16–25 mesh.[1] | | | | | |
| III-8 | Acetone, 0.3 | No | Suspension failed | | | | | |
| III-9 | Invert sugar (72%),[2] 0.3 | Yes | | 33.5 | 53.4 | 8.8 | 1.6 | 0.1 |
| III-10 | Glucose, 0.3 | No | Suspension failed | | | | | |

[1] Sample was not screened.
[2] A commercially available sugar mixture containing 72% by weight of a 1/1 glucose/fructose mixture.

It can be seen from Table III that the terminal vicinal hydroxy-keto structure is a necessary structural element in the surprisingly novel extenders of this invention. Even compounds with structures closely related exhibit a pronounced different effect in the suspension system. For example, monohydroxyacetone (III–7) a terminal vicinal hydroxy-keto compound, is an excellent extender for the tricalcium phosphate and provided good bead-size (partibe determined by experimentation similar to that represented by Table IV.

EXAMPLE V

To illustrate that the terminal vicinal hydroxy-keto extenders of this invention must be the sole extender in the system, the following experiments were run using the system hydroxy-keto compound-diphenylethane-carboxylic acid as taught in Harris, U.S. 3,214,497.

To each of two 12-ounce Crown cap bottles, was added 100 parts of water containing 0.25 part of the dispersing agent, tricalcium phosphate, 0.30 part of catalyst consisting of 0.25 part of benzoyl peroxide and 0.05 part of t-butyl perbenzoate, 100 parts of styrene monomer, and the weight percent of extender based on styrene monomer shown in Table I below. The bottles were placed in an oil bath at 90° C. and heated for 9 hours at 90° C. with end-over-end agitation, after which the suspensions were cooled and acidified with HCl to a pH of about 1.0. The beads were separated from the aqueous phase, washed with water by means of a centrifuge, and were then air dried on trays and screened into portions. The weight percent retained on each screen number is reported in Table V below. The data shows clearly that the system of Harris causes complete loss of suspension, while the system of this invention gives a narrow bead-size distribution.

a narrow distribution of bead diameter sizes which comprises adding to the suspension as sole extender a compound selected from the group consisting of fructose, sorbose, monohydroxyacetone, 1,3-dihydroxyacetone, invert sugar, and mixtures thereof in an amount of between about 0.01 and 5.0 percent by weight, based on monomer.

2. The process of claim 1 wherein said phosphate is tricalcium phosphate.

3. The process of claim 1 wherein said polymerization produces spherical polymer beads having an average particle size greater than 750 microns.

4. The process of claim 1 wherein said monomer is styrene and said catalyst comprises benzoyl peroxide and t-butyl perbenzoate.

TABLE V

| Bottle Number | 1,3-dihydroxyacetone (weight percent) | Stearic acid (weight percent) | 1,2-diphenylethane (weight percent) | Screen analysis (Number)—weight percent | | | | |
|---|---|---|---|---|---|---|---|---|
| | | | | 10 | 16 | 25 | 40 | Pan |
| 1 | 0.10 | | | 10.4 | 75.8 | 12.8 | 1.3 | 0.2 |
| 2 | 0.10 | 0.5 | 0.25 | Lost suspension | | | | |

What is claimed is:

1. In a process for producing polymer beads by polymerizing a vinyl aromatic monomer selected from the group consisting of styrene, monochlorostyrene, dichlorostyrene, and alpha-methylstyrene, with an oil-soluble, free-radical generating catalyst in an aqueous suspension under polymerizing conditions, where the suspension is stabilized by the presence of from 0.20 to 2.0 percent by weight based on monomer, of a finely divided, difficultly water-soluble phosphate, the improvement for producing

References Cited
UNITED STATES PATENTS

| | | | |
|---|---|---|---|
| 2,594,913 | 4/1952 | Grim | 260—93.5 W |
| 2,652,392 | 9/1953 | Hohenstein et al. | 260—93.5 W |
| 2,776,953 | 1/1957 | Taves | 260—17.4 |
| 3,214,497 | 10/1965 | Harris | 260—93.5 W |
| 3,328,374 | 6/1967 | Ronden et al. | 260—93.5 W |

JAMES A. SEIDLECK, Primary Examiner

U.S. Cl. X.R.

260—91.5